UNITED STATES PATENT OFFICE.

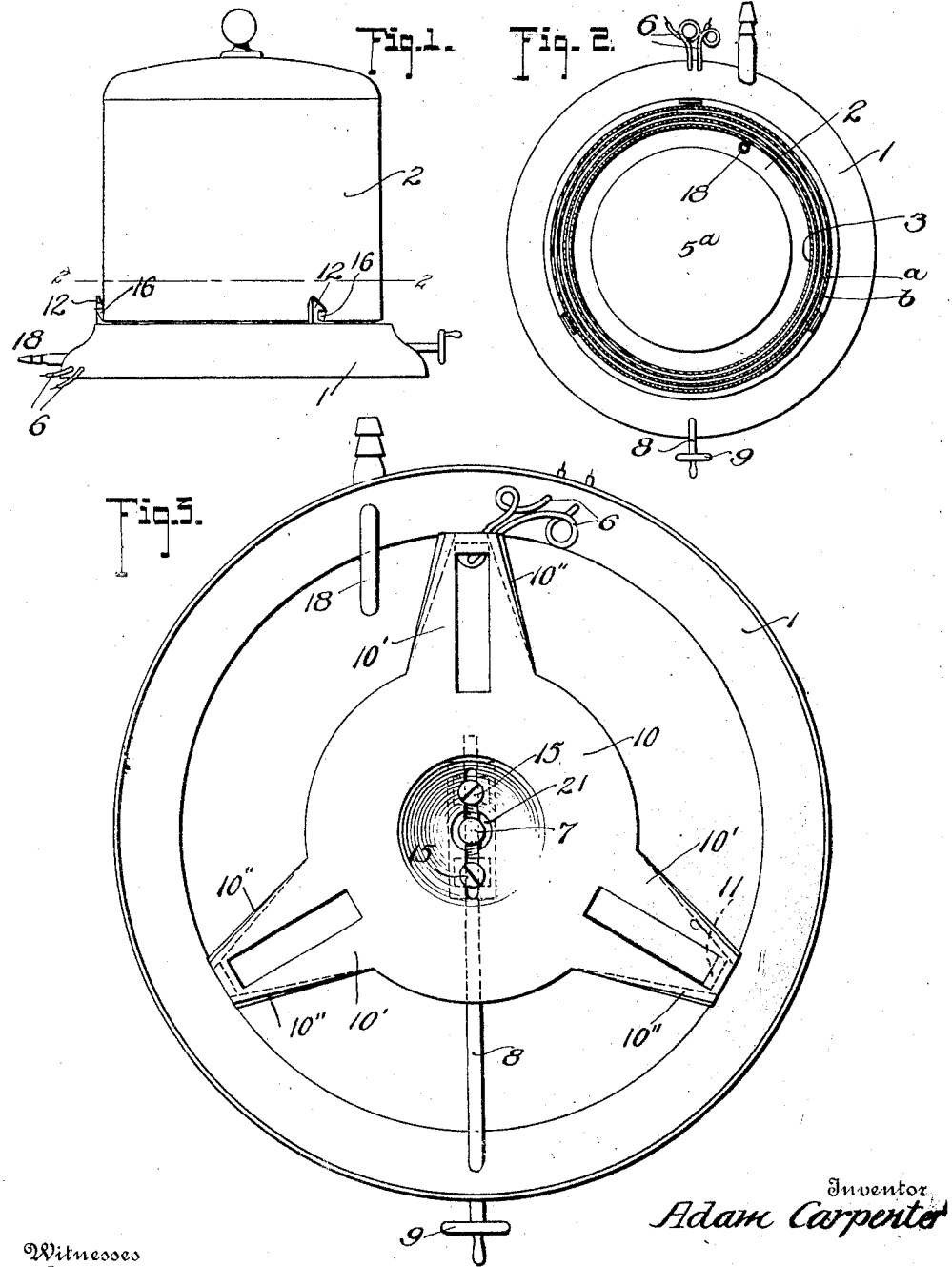

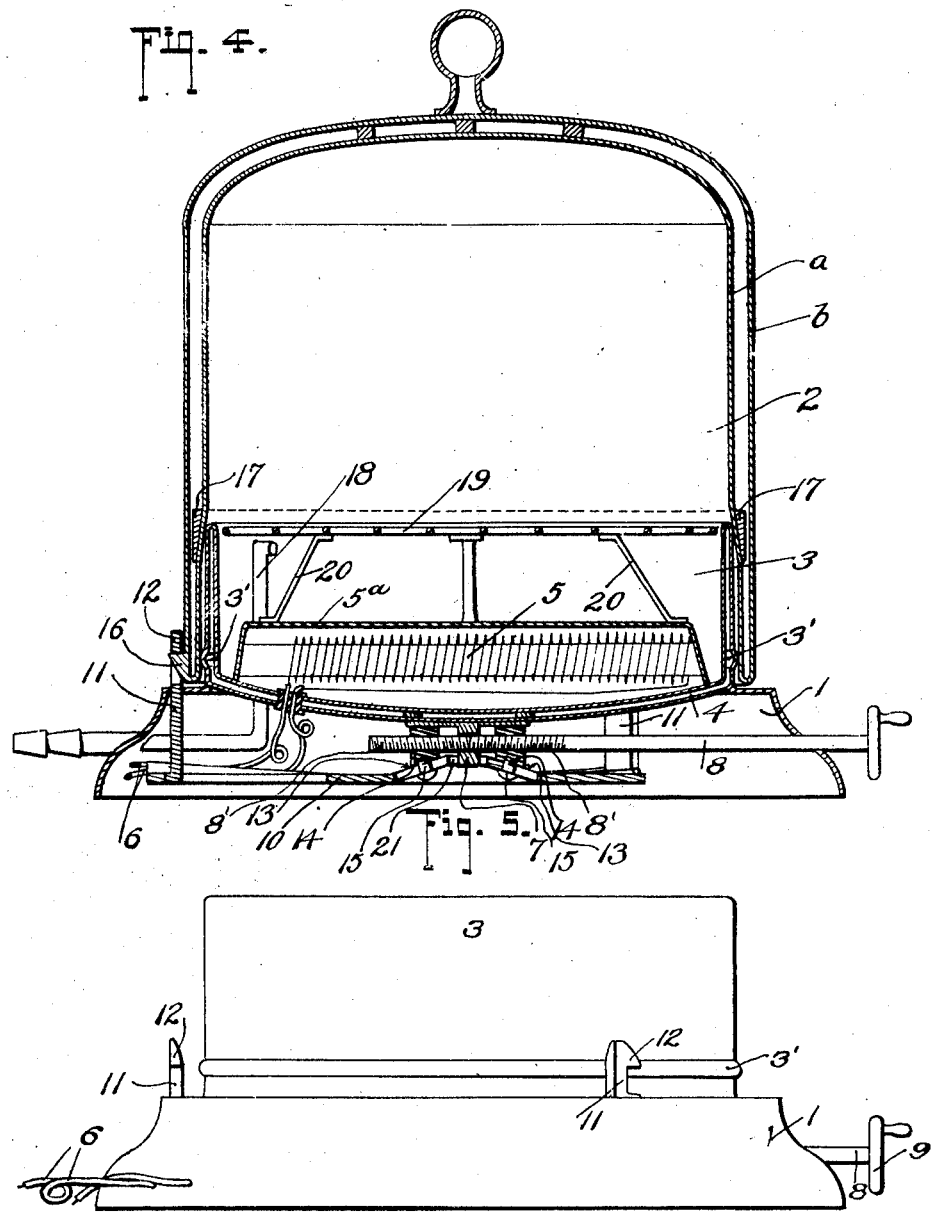

ADAM CARPENTER, OF ELMIRA, NEW YORK.

COMBINED COOKER AND HEATER.

1,043,667. Specification of Letters Patent. Patented Nov. 5, 1912.

Application filed November 20, 1911. Serial No. 661,298.

*To all whom it may concern:*

Be it known that I, ADAM CARPENTER, a citizen of the United States, residing at Elmira, in the county of Chemung and State of New York, have invented certain new and useful Improvements in Combined Cookers and Heaters, of which the following is a specification.

This invention relates broadly to combined cookers and heaters, the object thereof being to provide a construction adapted for use with all of the advantages of the ordinary type of fireless cooker but having associated therewith heating means by which articles of food may be heated to any desired degree by said means, and subsequently subjected to the action of the heat previously generated and retained in the cooking chamber.

An essential feature of the invention resides in the provision of a casing having the main cooking chamber of the apparatus combined with a base carrying the heating means, and the association of a manipulative locking device for connecting the base with the casing in an air-tight and water-tight manner.

The invention also resides in certain details of construction, the advantages of which will appear more fully hereinafter.

For a full understanding of the present invention, reference is to be had to the following description and to the accompanying drawings, in which—

Figure 1 is a side elevation of a combined cooker and heater embodying the essential features of the invention. Fig. 2 is a sectional view taken on the line 2—2 of Fig. 1. Fig. 3 is a bottom plan view of the device showing more clearly the means for connecting the casing with its base section. Fig. 4 is a vertical longitudinal sectional view bringing out the details of the construction of the interior parts. Fig. 5 is a side view of the base section of the device alone.

Throughout the following detailed description and on the several figures of the drawings, similar parts are referred to by like reference characters.

Referring to the drawings, the combined cooker and heater of this invention comprises the base 1 and the casing 2 mounted on said base, said casing comprising preferably a double walled structure, the inner and outer walls being designated *a* and *b*, respectively. The space between the walls of the casing 2 has the air withdrawn therefrom to provide as nearly a vacuum as possible, whereby the heat and cold retaining functions of the casing are subserved.

The base 1 or base section is provided with a double walled flange 3 which constitutes an extension of a double bottom 4, the space between the walls of the parts 3 and 4 constituting a vacuum chamber in the same manner as the space between the walls of the casing 2. On the bottom 4 is a heater 5 of any conventional form, the same being preferably of the electric type supplied with current by the wires 6 connected with coils of said heater, and leading to a suitable source of electricity. On the under side of the bottom 4 is provided a depending bearing 7 in which is mounted the inner end portion of an operating shaft 8, the outer portion of which extends through an opening forming a bearing at a side of the base, said shaft carrying a hand wheel 9 at its outer extremity.

A locking plate 10 is arranged beneath the bottom 4, and is provided with a plurality of vertical locking members 11 projecting upwardly through openings at the upper portion of the base 1 and having catches 12 to engage with catches 16 on the lower end of the casing 2. At its central portion, the locking plate 10 has oppositely inclined cam portions 13 formed preferably by pressing the body of the plate upwardly at its central portion. At opposite sides of the bearing 7 are wedges 14 movable between the cams 13 and the bottom 4 and having threaded openings therein to receive the reversely threaded portions 8′ of the shaft 8. The wedges 14 have pin and slot connections 15 with the cams 13 and it will be apparent that when the shaft 8 is turned in one direction, the wedges 14 move toward one another, riding between the parts 4 and 13 and thereby imparting downward relative movement to the lock plate 10 causing the locking members 11 of the latter to coöperate with the catches 16, thereby positively drawing the casing 2 down upon the base 1 and establishing between the flange 3 and said casing, an air and water tight connection.

To reinforce the inner wall *a* of the casing 2 at the point of contact of the upper portion of the flange 3 therewith, the former has a reinforcing band 17 applied thereto between said walls *a* and *b*.

In order to permit of ready separation of the casing 2 from its base, a movement of the shaft 8 opposite to that before mentioned will actuate the wedges 14 in such a manner as to permit of ready disengagement of the parts 12 and 16.

If desired, a certain amount of water may be placed in the casing and will be contained in the space surrounded by the flange 3.

It is contemplated to use in connection with the cooker and heater, a regulator of the thermostatic or other type and a steam pressure pipe 18 leads into the casing, to permit the pressure medium to pass to the regulator, which will be connected with the source of electric current for the heater 5, whereby, when the heat in the casing 2 reaches a predetermined point, the heater will be turned off automatically. As soon as the temperature in the cooker lowers below a predetermined minimum, the regulator will start the heater again. If desired, the regulator for the above purpose may be of the type set forth and described in my application for patent filed November 15, 1910, Serial Number 592,501.

I do not wish to be limited in any way in the practical embodiment of my invention, to the use of any special type of heater because any suitable type of heater other than that illustrated might be employed for the purposes of the invention. It will be apparent that, according to the arrangement of the cooker, as above described, the heater is located so that the casing 5$^a$ inclosing same will be in direct contact with any water retained at the base of the device, thereby increasing the efficiency of the invention in a desirable manner. On the casing 5$^a$ furthermore, may rest the tray 19 supported by legs 20, or otherwise supported so as to be convenient for removal. Articles of food will preferably be placed upon the tray in the cooking operation.

It will be noted that the locking arms 11 are preferably carried by extensions 10' of the plate 10, being struck up from said extensions, as shown clearly in the drawings. In order to increase the rigidity of the extensions 10', they will preferably be formed with longitudinal flanges 10'' at their edges. The depending bearing 7 snugly fits in a central opening 21 in the plate 10 so as to properly guide said plate and the locking members 11 when moved relatively to the base and casing 2.

An annular rib 3' formed by pressing outwardly the outer wall of the flange 3, serves to assist in centering the casing 2 upon the base.

Various modifications of the detail features of the invention may be made in accordance with the spirit thereof and especially in applying the locking means hereinbefore referred to in proper coöperation with relatively movable parts of the cooker and heater.

It will be understood that the cooker herein described may be readily employed for holding articles of cooled food since the invention will be as effective in operation in either condition according to the result desired.

Having thus described the invention, what is claimed as new is:

1. In a cooker of the class described, the combination of a base section, a casing mounted thereon, means for positively connecting said parts comprising locking members mounted on one of the parts and adapted for engagement with the other part, an operating shaft, and means on said shaft for imparting opposite movements to each of said locking members to effect positive connection and release of the casing and base section.

2. In a cooker of the class described, the combination of a base section, a casing mounted thereon, means for positively connecting said parts comprising locking members mounted on one of the parts and adapted for engagement with the other part, wedges engaging one of the parts aforesaid and arranged for actuating said locking members, and an operating device for moving said wedges to thereby control the locking action of the locking members.

3. In a cooker of the class described, the combination of a base section, a casing mounted thereon, means for positively connecting said parts comprising locking members mounted on one of the parts and adapted for engagement with the other part, a plate carrying the locking members and in spaced relation to the base section, wedges operating between the base section and said plate, and a shaft for actuating said wedges to thereby impart movement to the locking members controlling the locking action of the latter.

4. In a combined cooker and heater, a base, a casing supported thereon and having catches adjacent to the base, locking members adapted to engage said catches, a plate beneath the base connected to the said locking members and having opposite cams, and wedges operable in engagement with said cams for controlling the coöperation of the locking members and catches aforesaid.

5. In a combined cooker and heater, a casing, a base therefor, a lock plate carried by one of said parts, locking members on said lock plate coöperating with the other part and said plate also having cams inclining in opposite directions, wedges movable longitudinally of said cams, and a shaft having oppositely threaded portions engaging said wedges for imparting movement to each wedge in opposite directions to control the operation of the locking members.

6. In a combined cooker and heater, a double walled casing, a base having a double walled bottom for said casing, a locking plate spaced from said bottom, a guide bearing on the bottom coöperating with said plate, catches on the casing, locking members on the locking plate coöperating with said catches, wedges slidable between the bottom aforesaid and the locking plate, and an operating shaft mounted in the said bearing and connected with said wedges for actuation of the same to impart movement to the locking members.

7. In a combined cooker and heater, a double walled casing, a base having a double walled bottom for said casing, a locking plate spaced from said bottom, a guide bearing on the bottom coöperating with said plate, catches on the casing, locking members on the locking plate coöperating with said catches, wedges slidable between the bottom aforesaid and the locking plate, an operating shaft mounted in the said bearing and connected with said wedges for actuation of the same to impart movement to the locking members, the locking plate being formed with cams in contact with which the wedges operate, and pin and slot connections between the wedges and said cams.

In testimony whereof I affix my signature in presence of two witnesses.

ADAM CARPENTER.

Witnesses:
   G. O. ROSE,
   H. C. ROBB.